United States Patent [19]

Morawski

[11] 4,280,729
[45] Jul. 28, 1981

[54] FLOOR MAT

[76] Inventor: Janusz Morawski, P.O. Box 562, Station P, Toronto, Ontario, Canada

[21] Appl. No.: 72,113

[22] Filed: Sep. 4, 1979

Related U.S. Application Data

[63] Continuation-in-part of Ser. No. 904,772, May 11, 1978, abandoned.

[51] Int. Cl.³ .............................................. B60N 3/04
[52] U.S. Cl. ...................................... 296/1 F; 15/215
[58] Field of Search ....................... 428/167; 296/1 F; 52/660; 15/215, 238; 4/185 R, 185 F; D12/203

[56] References Cited

U.S. PATENT DOCUMENTS

| | | | |
|---|---|---|---|
| D. 171,301 | 1/1954 | Kravitz | 15/215 |
| 1,776,510 | 9/1930 | Keys et al. | 296/1 F |
| 2,701,890 | 2/1955 | Moor, Jr. | 15/215 |
| 2,897,963 | 8/1959 | Byers, Jr. | 296/1 F |
| 3,206,785 | 9/1965 | Heil | 15/215 |
| 3,312,498 | 4/1967 | Stata | 296/1 F |
| 3,387,315 | 6/1968 | Stata | 296/1 F |
| 3,390,912 | 7/1968 | Stata | 296/1 F |
| 3,488,081 | 1/1970 | Nolen | 296/1 F |
| 3,605,166 | 9/1971 | Chen | 296/1 F |
| 3,856,610 | 12/1974 | Bruneel | 296/1 F |

Primary Examiner—Henry F. Epstein

[57] ABSTRACT

A floor mat having an upper and an underside, and a forward and rear end, and in which the upper side is provided with a tread portion, having a multiplicity of water flow guide-ways or channels or grooves, communicating with the rear end of the mat, and guiding water flow from the front towards the rear of the mat, and further having water collectors at the rear end of the mat, below the plane of the water guide-ways, in which water may collect, and having hinge formations by means of which it can be folded for ease of handling, when carrying water in the water collectors.

10 Claims, 13 Drawing Figures

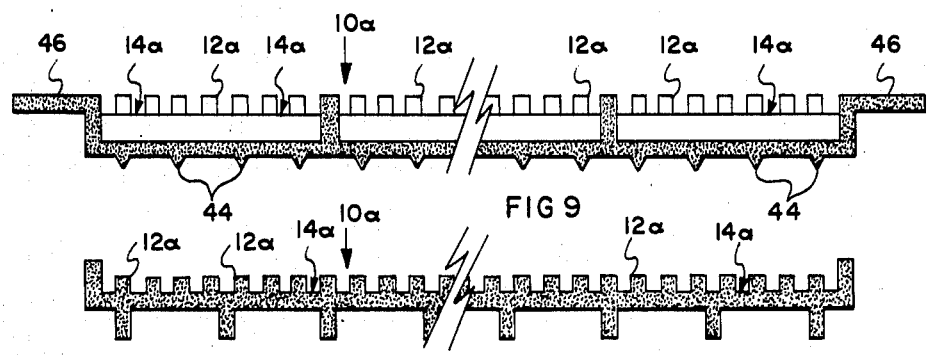
FIG 9
FIG 10
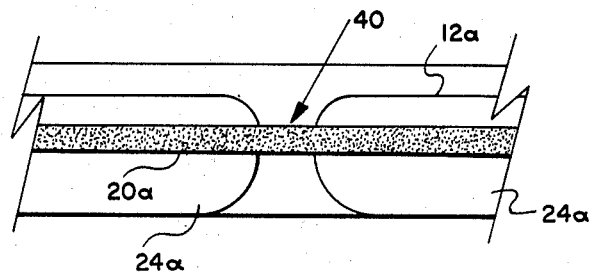
FIG 11
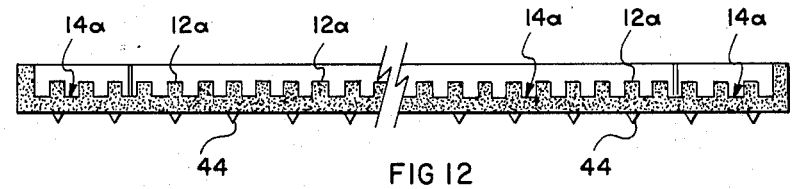
FIG 12
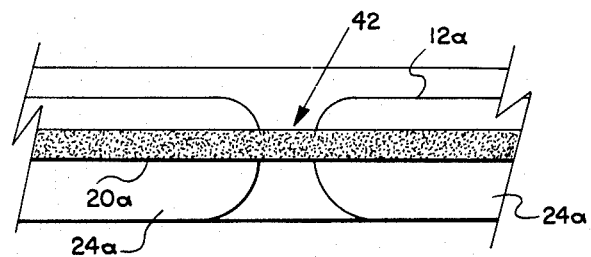
FIG 13

FLOOR MAT

This application is a continuation-in-part of application Ser. No. 904,772, entitled "Floor Mat" filed May 11th, 1978 and now abandoned.

The invention relates to a floor mat especially for use in automobiles and other vehicles.

In bad weather, water, snow, mud and the like accumulate on the floor of an automobile. In many cases the water or melted snow will then simply rot the carpet, and corrode the floor of the vehicle. Various rubber and plastic floor mats are available. However, in the great majority of cases, the volumes of water and melted snow are such that the water simply flows off the mat into the carpet. This is particularly true when it is considered that the vehicle is subjected to acceleration, or deacceleration which will cause the water to flow backwardly or forwardly off the mat.

For all of these reasons it is therefore desirable to provide a floor mat for vehicles which both controls the flow of water on the mat, and guides it in a particular direction, and in addition, which also provides water collectors or recesses, in which the water may be collected, and from which it may readily be removed.

BRIEF SUMMARY OF THE INVENTION

With these general objectives in mind, the invention provides a floor mat having an upper and an underside, and a forward and rear end, and in which the upper side is provided with a tread portion, having a multiplicity of water flow guide-ways or channels or grooves, communicating with the rear end of the mat, and guiding water flow from the front towards the rear of the mat, and further having water collectors at the rear end of the mat, below the plane of the water guide-ways, in which water may collect.

A further feature of the invention is the provision of partition walls in the water collectors to restrain the water from surging to and fro during driving of the vehicle.

The invention further provides, on the underside of the tread portion of the floor mat, any suitable form of padding raising the level of the water guide-ways above that of the water collectors, so that water flowing down the water guide-ways and accumulating in the collectors will not flow in the reverse direction.

Preferably, the structure of the water collectors will be of flexible rubber material. In this way any water collecting therein, which may freeze, can still be readily removed as ice cubes.

A further feature is the provision of one or more transverse hinge formations along which the mat can be folded. This facilitates the handling of the mat when the water collectors are full of water. Handles may also be provided for lifting the mat.

A stop bar or ridge can also be attached on the mat to provide a heel rest for the driver.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 9 is a section along the line 9—9 of FIG. 7;

FIG. 10 is a section along the line 10—10 of FIG. 7;

FIG. 11 is a section along the line 11—11 of FIG. 7;

FIG. 12 is a section along the line 12—12 of FIG. 7; and,

FIG. 13 is a section along the line 13—13 of FIG. 7.

Figure 2:
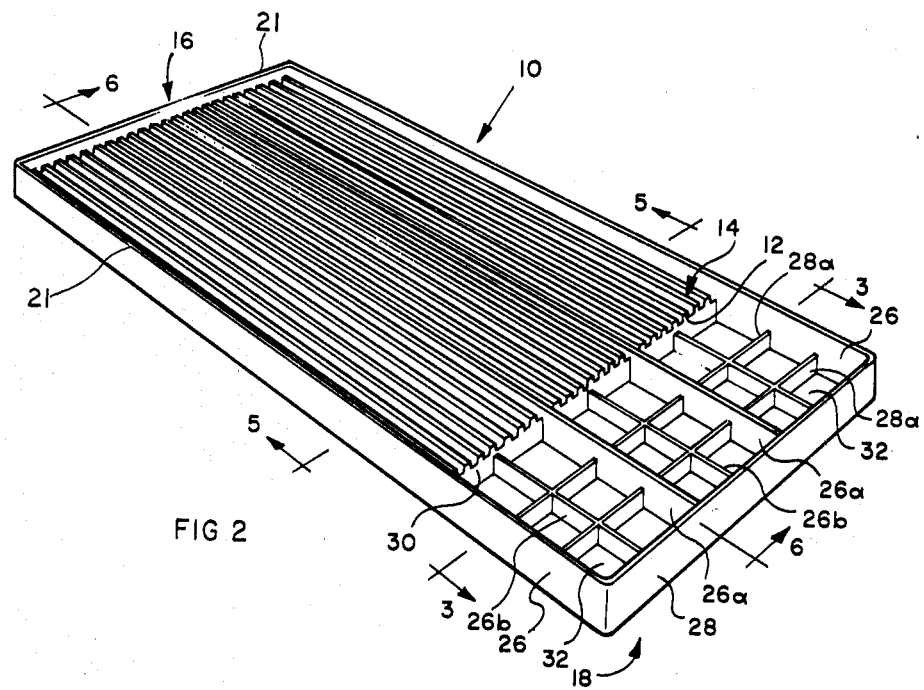
FIG. 2 is a perspective illustration showing the upper side of the invention.

As shown in the drawings, the floor mat according to the invention is provided with a tread portion having an upper surface 10 having a series of alternate longitudinal ridges or ribs 12 and intervening grooves or channels 14 constituting water guide-ways, running from the front or forward edge 16 of the mat, towards the rearward end 18.

The ridges or ribs 12 are carried on a generally horizontal web portion 20. A perimeter wall 21 is raised above the ribs 12 and closes off the front end of the grooves 14.

On the underside 22 of the tread portion of the mat, there is provided a honeycomb pad formation consisting of spacer walls 24, the function of which is to hold the web 20 at a predetermined elevation.

At the rearward end 18, a pair of side walls 26, and intermediate partition walls 26a, cooperate with end walls 28, and intermediate wall 30, and a bottom wall 32, to provide a group of water collectors or recesses. Bottom wall 32 is located below the plane of web 20, and is generally co-planar with the lower edges of the spacer walls 24. The open rear ends of the grooves 14 will permit water to flow downwardly over the intermediate wall 30 into these collectors, where such water will collect, and be unable to flow back again onto the upper surface of the mat 10.

The walls 26, 28, 30 and 32 are generally speaking of flexible material so that if the water freezes, the walls may expand, and at the same time cubes of ice may simply be snapped out.

The use of the floor mat is self-evident. Water will simply collect in the grooves 14, and as the vehicle accelerates it will flow back into the water recesses defined by the walls 26, 28, 30 and 32. At the end of the day, the water collected there may simply be dumped out. Alternatively, if it freezes, then the ice may simply be snapped out.

The ease of removal of water is a particular advantage. Removal of water from a conventional rubber mat has to be carried out with great care. The mat flexes when it is lifted. Water will then run off the mat. In the invention however, the collectors can easily be held steady while lifting so that the water will not escape.

In this way a substantial portion of the water, snow, etc., entering the car on the shoes of the driver or passenger will be retained and discarded so that it does not simply soak into the mat, or corrode the metal of the vehicle.

Additional partition walls 28a and 26b of reduced height in relation to walls 26a may usefully be provided to sub-divide the collectors into smaller compartments. In this way, surging of water during driving of the vehicle is restrained. Such walls 28a and 26b may if desired be removable but for simplicity are preferably integral with the mat 10. The entire mat 10 is usefully molded as a one-piece integral structure of for example rubber, thermo-plastic or the like.

Where a lighter weight mat, or a mat having a larger surface area is required, the mat becomes too flexible. As a result, when it is lifted up some of the water runs off.

In order to overcome this, a modified mat is shown in FIGS. 7 to 13.

Figure 1:
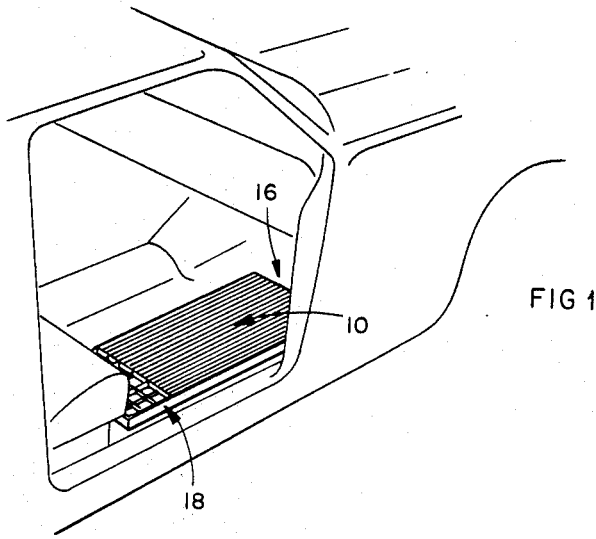
FIG. 1 is a perspective illustration showing the interior of an automobile, with the floor mat according to the invention shown in position in the passengers compartment.
Figure 3:
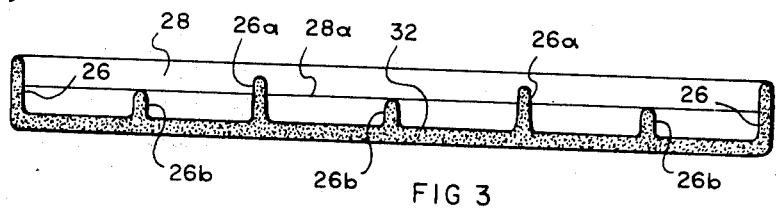
FIG. 3 is a section along the line 3—3 of FIG. 2.
Figure 4:
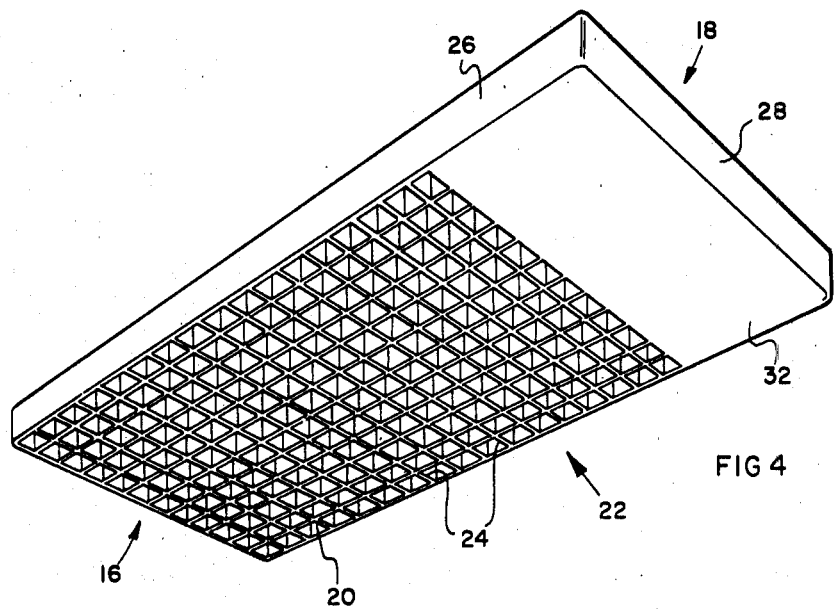
FIG. 4 is a lower perspective illustration.
Figure 5:
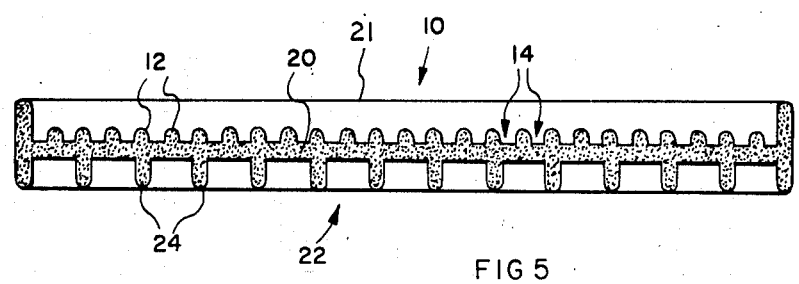
FIG. 5 is a section along the line 5—5 of FIG. 2.
Figure 6:
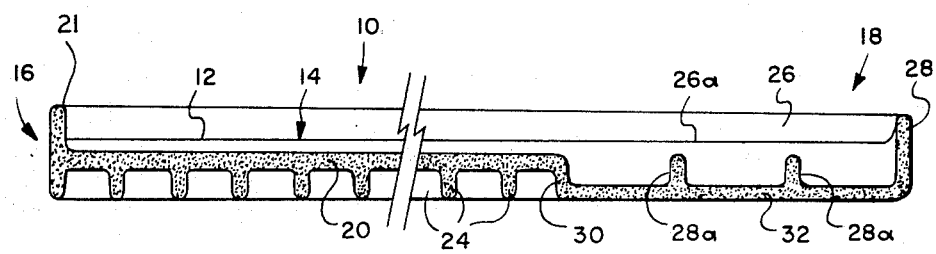
FIG. 6 is a section along the line 6—6 of FIG. 2.
Figure 7:
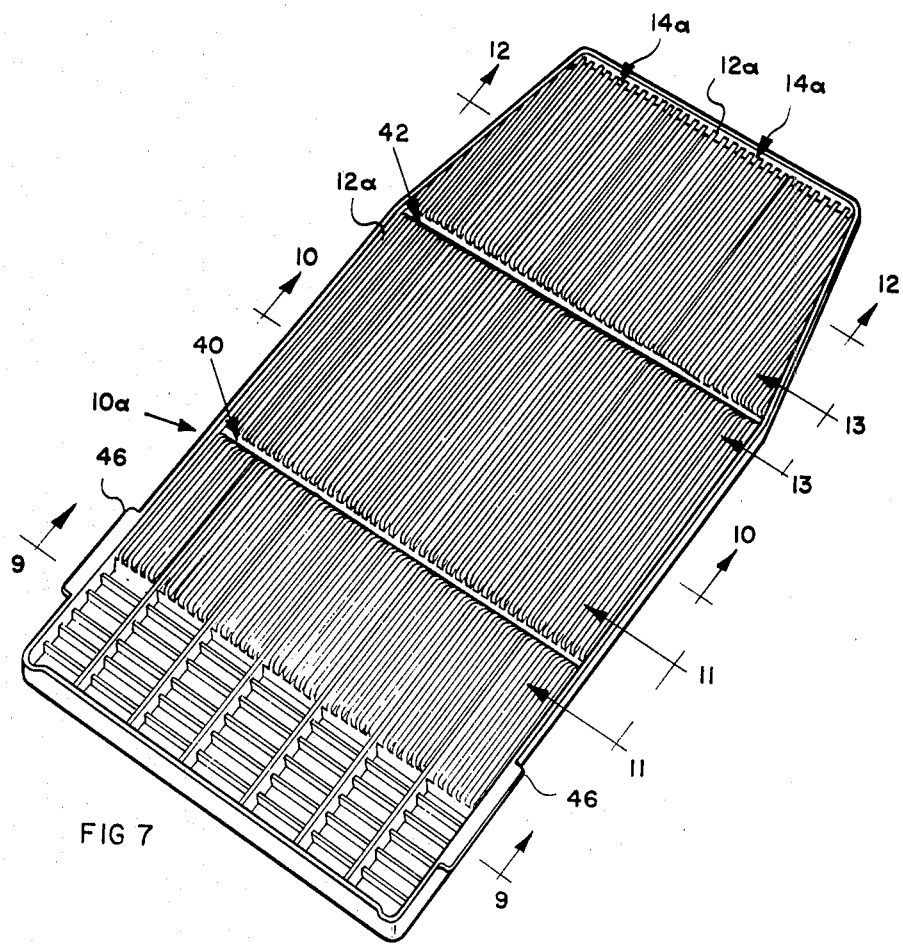
FIG. 7 is a perspective of a further embodiment.
Figure 8:
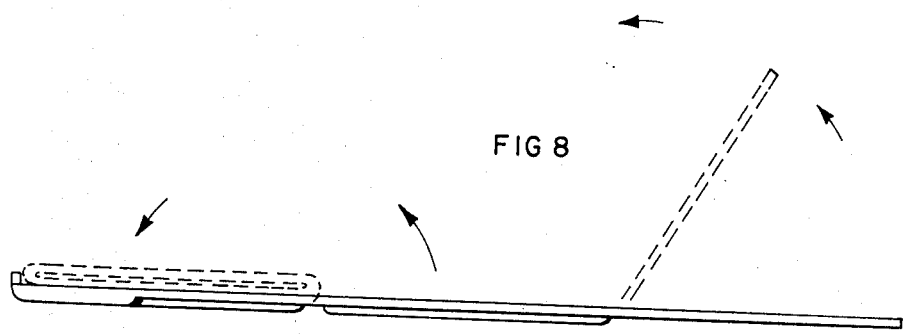
FIG. 8 is a side elevation of the mat of FIG. 7.

Such a mat has an upper surface 10a having ridges 12a and grooves 14a, similar to the mat of FIG. 1. It is, however, traversed by one or more hinge formations 40, 42 (two such formations being selected as a matter of convenience only, without limitation) the ridges 12a being discontinuous at hinges 40, 42 to permit folding of the web 20a.

The mat also incorporates water collectors formed by walls 26a–b and 28a–b.

On the underside, spacer walls 24a are also interrupted at hinges 40, 42, for the same purpose to permit folding along such hinge lines.

The front portion of the modified mat, ie., from front edge 16 to hinge formation 42, on its underside is free of spacer walls 24 so that it can be flexed and tilted up to lie against and conform to the fire wall of a vehicle without obstructing use of the pedals. It may however be provided with small, pointed formations 44 on its underside for gripping the carpet of a vehicle.

Handles 46 can be provided on either side of the mat, near the rear end 18 for lifting it.

In use, when the collectors or recesses contain water, the mat is folded over along hinges 40 and 42. The handles 46 are then grasped and the mat can be lifted out of the vehicle and the water poured off. The mat, when folded up is much less likely to flex unexpectedly and dump the water before it is removed from the vehicle.

Such a mat can thus be made larger in surface area, and of thinner material while still functioning to effectively collect and remove water, etc., from the vehicle.

In addition to these advantages, it is found that by the use of this modified form of the invention, it is possible to provide a water collector type of mat in accordance with the invention, having a front end portion which may fold up or lie at an upward angle against the fire wall of the vehicle, without unduly distorting the shape of the mat.

This arises because of the fact that, whereas a relatively thin flexible type of mat such as has been used in the past, may fairly readily flex upwardly and lie against the fire wall of the vehicle, when thicker material is used, such as is in the case of the present invention, to provide a true water collecting type function, the upward flexing of a mat against the fire wall produces various undesirable results. In particular, the mat does not lie flat against the floor of the vehicle, and consequently the use of the control pedals and the like is subject to interference from the mat.

In addition, the mat when flexed upwardly, tends to have a relatively substantial degree of inherent resilience, and is consequently sliding backwardly down the fire wall.

By the use of the present invention, incorporating hinge formations transversely across the mat, it is possible to overcome this problem so that notwithstanding the greater thickness of the mat, it will still lie flat both on the floor and the fire wall of the vehicle without either interfering with the use of the vehicles, and without exhibiting a tendency to slide rearwardly.

Having described what is believed to be the best mode by which the invention may be performed, it will be seen that the invention may be particularly defined as follows:

A two-level floor mat for horizontal floors such as floors in motor vehicles, and comprising a tread portion having a longitudinal axis and having a plurality of longitudinal grooves therein parallel to such axis such grooves defining a predetermined water level for flow of water therealong, pad means under said tread portion having a lower surface adapted to lie horizontal on said horizontal floor and locating said tread portion and said grooves at a predetermined level raised above the horizontal floor, water collector means located at one end of said tread portion with said grooves in water flow communication therewith, said collector means having a bottom wall portion lying at a second predetermined level below the level of said tread portion and said grooves whereby water flowing along said grooves will flow downwardly into said collector means and collect therein, and will not subsequently readily flow forwardly into said grooves, and, an undersurface forming part of said bottom wall portion and lying on said floor co-planar with said lower surface of said pad means whereby in use on said horizontal floor, said tread portion, and said collector means both are supported horizontal, but in different planes.

The invention further comprises such a floor mat wherein said tread portion comprises a web, a plurality of upstanding ridges defining grooves therebetween, and a perimeter wall around the front and two sides thereof higher than said ridges.

The invention further comprises such a floor mat wherein said pad means comprises a plurality of wall formations formed on the underside of said web, and having lower edges forming said lower surface.

The invention also comprises a mat formed with rib formations, and having transverse hinge formations formed across such rib formations, whereby the mat may be folded once or more for ease of handling.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A two-level floor mat for horizontal floors such as floors in motor vehicles, and comprising;
    a tread portion having a longitudinal axis and having a plurality of longitudinal grooves therein parallel to such axis such grooves defining a predetermined water level for flow of water therealong;
    pad means under said tread portion having a lower surface adapted to lie horizontal on said horizontal floor and locating said tread portion and said grooves at a predetermined level raised above the horizontal floor;
    water collector means located at one end of said tread portion with said grooves in water flow communication therewith, said collector means having a bottom wall portion lying at a second predetermined level below the level of said tread portion and said grooves whereby water flowing along said grooves will flow downwardly into said collector means and collect therein, and, will not subsequently readily flow forwardly into said grooves, and, an undersurface forming part of said bottom wall portion and lying on said floor co-planar with said lower surface of said pad means whereby in use on said horizontal floor, said tread portion, and said collector means both are supported horizontal, but in different planes.

2. A floor mat as claimed in claim 1 wherein said tread portion comprises a web, a plurality of upstanding ridges defining grooves therebetween, and a perimeter wall around the front and two sides thereof higher than said ridges.

3. A floor mat as claimed in claim 2, wherein said pad means comprises a plurality of wall formations formed on the under side of said web and having lower edges forming said lower surface.

4. A floor mat as claimed in claim 3 wherein said water collector means comprises a front wall, a back wall and two side walls, said front wall being in flow communication with said web, and including a plurality of partition walls dividing said collector means into a plurality of smaller spaces.

5. A floor mat as claimed in claim 4, including a perimeter wall around said water collector means, said perimeter wall comprising an upward extension of said back wall and the said two side walls, and reaching the same height as the perimeter wall around said tread portion, said two perimeter walls being formed integrally as a single structure, and substantially completely encircling said tread portion and said water collector means.

6. A floor mat as claimed in claim 1, including hinge means extending transversely of the mat intermediate its ends, whereby the same may be folded over upon itself.

7. A floor mat as claimed in claim 6, including a plurality of upstanding ridges defining grooves therebetween, in said tread portion of said web, and including a plurality of wall formations on the underside of said web, and wherein said ridges and said wall formations are discontinued in the region of said hinge means, whereby to permit flexing of said web for folding of said mat.

8. A floor mat as claimed in claim 7 wherein there are two hinge formations forming said hinge means, said hinge formations being arranged parallel to one another transversely across said mat, and being spaced apart whereby said mat may be folded twice.

9. A floor mat as claimed in claim 6 including handle means extending outwardly from the sides of said mat for lifting of same.

10. A floor mat as claimed in claim 9 wherein said two hinge formations define a front portion and an intermediate portion and a rearward portion of said mat, and wherein said front portion has an undersurface free of said wall formations whereby the same may flex upwardly and conform to the fire wall of the vehicle, and including handle means on the rearward portion of said mat, for lifting of same when folded.

* * * * *